(12) United States Patent
Alharayeri

(10) Patent No.: US 9,357,352 B1
(45) Date of Patent: *May 31, 2016

(54) LOCATION-BASED DISCOVERY OF NETWORK MEMBERS BY PERSONAL ATTRIBUTES USING DYNAMIC AND STATIC LOCATION DATA

(71) Applicant: WIRELESS DISCOVERY LLC, Los Gatos, CA (US)

(72) Inventor: Ramzi Alharayeri, San Jose, CA (US)

(73) Assignee: WIRELESS DISCOVERY LLC, Los Gatos, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/000,960

(22) Filed: Jan. 19, 2016

Related U.S. Application Data

(63) Continuation-in-part of application No. 14/570,779, filed on Dec. 15, 2014, now Pat. No. 9,264,875, which is a continuation-in-part of application No. 12/351,654, filed on Jan. 9, 2009, now Pat. No. 8,914,024.

(60) Provisional application No. 61/010,891, filed on Jan. 10, 2008.

(51) Int. Cl.
*H04W 24/00* (2009.01)
*H04W 4/02* (2009.01)
(Continued)

(52) U.S. Cl.
CPC ............. *H04W 4/025* (2013.01); *H04L 51/36* (2013.01); *H04L 67/12* (2013.01); *H04L 67/18* (2013.01); *H04L 67/306* (2013.01)

(58) Field of Classification Search
CPC .......................... H04W 4/02; H04L 29/08657

USPC ........... 455/41.2, 412.2, 414.1, 426.1, 432.3, 455/434, 456.3

See application file for complete search history.

(56) References Cited

U.S. PATENT DOCUMENTS 6,178,511 B1  1/2001  Cohen et al.
6,243,816 B1  6/2001  Fang et al.
(Continued)

FOREIGN PATENT DOCUMENTS

DE          10149496 A1    4/2003
EP           1450282 A2    8/2004
WO        PCTUS0930756    1/2009

OTHER PUBLICATIONS

Malley, A., "Apple seeks distance-based pairing, auto contact data patents," Webpage: http://appleinsider.com/articles/08/09/27/apple_seeks_distance_based_pairing_auto_contact_data_patents, published on Sep. 27, 2008, 2 pages.

*Primary Examiner* — Christopher M Brandt
*Assistant Examiner* — Matthew Genack
(74) *Attorney, Agent, or Firm* — Rahman LLC

(57) ABSTRACT

A technique for allowing members of the same social network using mobile devices to discover others in the vicinity by personal attributes and in specific picture(s) and name for the purpose of connecting, and the ability to use functions provided by a social network such as SMS, e-mail, chat/instant messaging, multimedia, or video by using unique hardware identification of each member mobile device and personal login information that are stored in a network server computing device; and associating the unique apparatus of the members' hardware with the members' personal profile such that when a search is initiated between members, the results contain the members' profile's picture(s), name, location and additional information as stored in the profiles. The proximity of the users is determined by static or dynamic location of the actual device location identified through mobile radio frequency location technology and internet IP information and saved in the user profile.

32 Claims, 9 Drawing Sheets

(51) Int. Cl.
*H04L 29/08* (2006.01)
*H04L 12/58* (2006.01)

(56) References Cited

U.S. PATENT DOCUMENTS

| | | |
|---|---|---|
| 7,249,182 B1 | 7/2007 | Heinonen et al. |
| 7,296,036 B2 | 11/2007 | Celik |
| 7,310,515 B2 | 12/2007 | Enderlein et al. |
| 7,346,855 B2 | 3/2008 | Hellyar et al. |
| 7,353,462 B2 | 4/2008 | Caffarelli |
| 8,472,874 B2 | 6/2013 | Tang et al. |
| 8,606,854 B2 | 12/2013 | Serlet |
| 2004/0009750 A1 | 1/2004 | Beros et al. |
| 2004/0113807 A1 | 6/2004 | Amram et al. |
| 2005/0026594 A1 | 2/2005 | Miller et al. |
| 2005/0076124 A1 | 4/2005 | Enderlein et al. |
| 2005/0193093 A1* | 9/2005 | Mathew ............ G06Q 30/02 709/219 |
| 2005/0281237 A1 | 12/2005 | Heinonen et al. |
| 2006/0063548 A1 | 3/2006 | Kim |
| 2006/0234631 A1 | 10/2006 | Dieguez |
| 2007/0021111 A1 | 1/2007 | Celik |
| 2007/0167136 A1 | 7/2007 | Groth |
| 2007/0168425 A1 | 7/2007 | Morotomi |
| 2007/0242814 A1 | 10/2007 | Gober |
| 2007/0260751 A1 | 11/2007 | Meesseman |
| 2008/0051033 A1 | 2/2008 | Hymes |
| 2008/0108308 A1* | 5/2008 | Ullah ............ G06Q 30/02 455/41.2 |
| 2009/0209202 A1* | 8/2009 | Martini ............ H04W 12/02 455/41.2 |

\* cited by examiner

LOCATION-BASED DISCOVERY OF NETWORK MEMBERS BY PERSONAL ATTRIBUTES USING DYNAMIC AND STATIC LOCATION DATA

CROSS-REFERENCE TO RELATED APPLICATIONS

This application is a continuation-in-part of U.S. application Ser. No. 14/570,779, filed on Dec. 15, 2014, which is a continuation-in-part of U.S. application Ser. No. 12/351,654, filed on Jan. 9, 2009, now U.S. Pat. No. 8,914,024, issued on Dec. 16, 2014, which claims benefit to U.S. Provisional Application No. 61/010,891 filed on Jan. 10, 2008, the complete disclosures of which, in their entireties, are herein incorporated by reference.

BACKGROUND

1. Technical Field

The embodiments herein generally relate to communication systems, and more particularly to device connectivity in a communications network.

2. Description of the Related Art

In light of the explosive use of mobile devices, social networks and email addresses, individuals are in need of the ability to exchange customized information such as pictures, social network profiles, emails and phone numbers using their mobile devices. There are methods to exchange contact information in the form of virtual cards (Vcards). However, there is generally no form of communication using mobile devices that allows discovery by personal attributes for the purpose of exchanging contact information. Furthermore, generally there is no available technology adapted allowing mobile device users to easily exchange contacts and/or related personal information over the internet for the purpose of social interaction by way of mobile devices without limitations to hardware brands.

Available methods for contact information exchange do not typically provide discovery by attributes. Rather, these methods assign pin numbers to individuals or offer discovery by a mobile class or mobile ID. Typically, these systems require a user to operate under a common telecommunication service provider operated network. Other methods are based on Bluetooth® technology in an ad hoc mode between two devices. These methods usually work only on the same brand mobile devices due to Bluetooth® technology limitations, compatibility and security issues.

In recent years, social networks began collaboration and establishment of an API protocol which stands for Application Programming Interface that allows for social networks to connect to each other with given permission from the user, to import data or pictures from one social network to another. Yet no method generally allows members of various social networks to interexchange contact information, or offer third party solution dedicated to members connecting with others whom are not known to members based on the vicinity and common interest.

Communication between two Bluetooth-enabled devices typically requires entering a passkey or security code to allow pairing or communication between any two devices. This desire for maintaining security/privacy, inherent in the design of existing Bluetooth-enabled devices, such as a Smartphone, has imposed undesirable limitations on mobile device users who wish to interact with each other in a social setting.

Other alternatives available for contact information exchange such as Beam technology permit the exchange to take place between similar mobile devices using an infrared signal. This particular solution is, however, limited. For example, it requires a line-of-sight between the devices and does not offer the ability to exchange information such as pictures as a personal attribute and limits the use to a similar brand of hardware transmitting in an ad hoc mode.

U.S. Pat. Nos. 6,868,451; 7,249,182; 7,440,746; 7,450,996; and 7,454,004, the complete disclosures of which, in their entireties, are herein incorporated by reference, focus on contact information storage, retrieval, Bluetooth® technology methods of profiles and exchange of contact information.

Additionally, there has been advanced ability to precisely determine mobile devices locations but all the standards in place are geared towards identifying devices locations as instruments. There are no human face associated with the searches in those standards and no links to social networks. They are simply industry standards without connection to exploding applications and methods of mobile devices use.

Multiple advanced technologies have been added to the mobile phone industry by International Organizations for Standards to provide accurate dynamic reporting of the mobile devices. Some of the standards adopted are: LBS (Location Based Service) based on GPS (Global local positioning), RTLS Real-Time Locating System, as noted in ISO/IEC 19762-5 and ISO/IEC 24730-1 and Geolocation which is also the latitude and longitude coordinates of a particular location. Geolocation uses radio Frequency RF location, TDOA (Time Difference Of Arrival), information from cell towers to triangulate the approximate position, and Internet Protocol (IP) address among other information to determine the exact address of a mobile device or terminal connected to the internet. The terms and definitions are standardized by ISO/IEC 19762-5:2008.

SUMMARY

In view of the foregoing, an embodiment herein provides a system comprising a computing device configured to communicate with various mobile and terminal devices to manage introduction and connection of members belonging to a same network by sharing personal attributes between members such as picture(s) and name, wherein the computing device associates unique hardware identification of member devices and login credentials with member profiles and via a search process returns searches of members for others in a vicinity or in proximity thereto, and with personal attributes comprising pictures and names bringing an image of a human face to a device allocation in the search process; and a first user using a respective first mobile communications device and a second user using a respective second mobile communications device each capable of connecting to the internet through any of a mobile telecommunications provider network and a local area wireless network, wherein the computing device being in communication with the first and second mobile communication devices through internet connection via an application installed on the respective first and second mobile communication devices of the users, and configured to provide access to stored user profile information about the first user and the second user, respectively, including personal attributes comprising picture(s), a name, information, and a location, wherein the computing device is configured to store static locations of members and receive information identifying current dynamic locations of all members based on real time location reporting from a client side application, wherein the computing device is configured to calculate and determine a proximity of user locations based on any of a static and a dynamic location of the members which are updated on a profile database of the members, wherein the computing device is configured to send to the first user upon inquiring of other members in the vicinity of the first user, personal attributes of all other members based on proximity calculations to select members that the first user may wish to connect with, and to send to the second mobile communication device an invitation on behalf of the first user and including first user personal attributes for the second user to accept connecting with the first user, wherein the computing device is configured to connect the first user and the second user through a members-only-social-network communication tools between the first user and the second user, wherein the communication tools comprise any of SMS, E-mail, chat/instant messaging, multimedia, voice, and video, and wherein the computing device is configured to locate information about the second user from a social network storage file of the second user, and transmit this information to the first mobile communications device for further information beyond first introductory attributes such as picture and name only.

The first and second users may be members of a same social network, and the computing device may be operable to disclose social network attributes of the first and second users in the vicinity or within a particular distance from one another for connecting members. The computing device may be configured to receive customized parameters from the first user on a search vicinity scope and a customized selection of a start point other than a current user location. The computing device may be operable to provide any user with the social network attributes of all members in the social network in the vicinity or in proximity thereto. The computing device may be configured to receive an inquiry from the first user regarding members in proximity to a first user location. The computing device may be configured to recommend to members other members in the vicinity to connect with to promote social interaction. The computing device may be configured to report to the first user social network attributes of all members of the social network who are in proximity to the first user. The computing device may be configured to receive from the first user a selection of one or more additional users with whom the first user wishes to connect with through the social network.

The computing device may be configured to send to the first user further social attributes of one or more of selected additional users beyond the picture and name used in the introductory search results. The computing device may be configured to obtain permission of a selected user prior to revealing further information beyond an introductory picture and name when a user preference is set for such a permission requirement. The computing device may be configured to update profile information to indicate that the first and second users are connected. The computing device may be configured to store communication between members and synchronize saved communication on a client side application used on devices for communication. The computing device may be configured to assess a proximity of users to one another based on any of a static location information in a user profile and updated location indicators of a user dynamic location. The updated location indicators may be based on user location information reported to the computing device by any of mobile device real time location reporting technology and internet protocol address location information and saved to profiles of users. The computing device may permit discoverable members to have their respective devices turned on or turned off at a time of a search being conducted by the first user, and the computing device may permit the discoverable members to have their respective devices unconnected to an internet connection service at the time of the search being conducted by the first user, wherein any of turned off devices and disconnected devices may be discoverable by the computer device as the internet connection service is configured to report the any of turned off devices and disconnected devices as discoverable based on a latest static and dynamic location in proximity to the first user.

Another embodiment provides a method comprising using a computing device to communicate with various mobile and terminal devices to manage introduction and connection of members belonging to a same network by sharing personal attributes between members such as picture(s) and name, wherein the computing device associates unique hardware identification of member devices and login credentials with member profiles and via a search process returns searches of members for others in a vicinity or in proximity thereto, and with personal attributes comprising pictures and names bringing an image of a human face to a device allocation in the search process; providing a first user using a respective first mobile communications device and a second user using a respective second mobile communications device each capable of connecting to the internet through any of a mobile telecommunications provider network and a local area wireless network; using the computing device to be in communication with the first and second mobile communication devices through internet connection via an application installed on the respective first and second mobile communication devices of the users, and to provide access to stored user profile information about the first user and the second user, respectively, including personal attributes comprising picture(s), a name, information, and a location; using the computing device to store static locations of members and receive information identifying current dynamic locations of all members based on real time location reporting from a client side application; using the computing device to calculate and determine a proximity of user locations based on any of a static and a dynamic location of the members which are updated on a profile database of the members; using the computing device to send to the first user upon inquiring of other members in the vicinity of the first user, personal attributes of all other members based on proximity calculations to select members that the first user may wish to connect with, and to send to the second mobile communication device an invitation on behalf of the first user and including first user personal attributes for the second user to accept connecting with the first user; using the computing device to connect the first user and the second user through a members-only-social-network communication tools between the first user and the second user, wherein the communication tools comprise any of SMS, E-mail, chat/instant messaging, multimedia, voice, and video; and using the computing device to locate information about the second user from a social network storage file of the second user, and transmit this information to the first mobile communications device for further information beyond first introductory attributes such as picture and name only.

The first and second users may be members of a same social network, and wherein the method further comprises using the computing device to disclose social network attributes of the first and second users in the vicinity or within a particular distance from one another for connecting members. The method may further comprise using the computing device to receive customized parameters from the first user on a search vicinity scope and a customized selection of a start point other than a current user location. The method may further comprise using the computing device to provide any user with the social network attributes of all members in the social network in the vicinity or in proximity thereto. The method may further comprise using the computing device to receive an inquiry from the first user regarding members in proximity to a first user location. The method may further comprise using the computing device to recommend to members other members in the vicinity to connect with to promote social interaction.

The method may further comprise using the computing device to report to the first user social network attributes of all members of the social network who are in proximity to the first user. The method may further comprise using the computing device to receive from the first user a selection of one or more additional users with whom the first user wishes to connect with through the social network. The method may further comprise using the computing device to send to the first user further social attributes of one or more of selected additional users beyond the picture and name used in the introductory search results. The method may further comprise using the computing device to obtain permission of a selected user prior to revealing further information beyond an introductory picture and name when a user preference is set for such a permission requirement. The method may further comprise using the computing device to update profile information to indicate that the first and second users are connected.

The method may further comprise using the computing device to store communication between members and synchronize saved communication on a client side application used on devices for communication. The method may further comprise using the computing device to assess a proximity of users to one another based on any of a static location information in a user profile and updated location indicators of a user dynamic location. The updated location indicators may be based on user location information reported to the computing device by any of mobile device real time location reporting technology and internet protocol address location information and saved to profiles of users. The method may further comprise using the computing device to permit discoverable members to have their respective devices turned on or turned off at a time of a search being conducted by the first user; and using the computing device to permit the discoverable members to have their respective devices unconnected to an internet connection service at the time of the search being conducted by the first user, wherein any of turned off devices and disconnected devices may be discoverable by the computer device as the internet connection service is configured to report the any of turned off devices and disconnected devices as discoverable based on a latest static and dynamic location in proximity to the first user.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION

Figure 1:
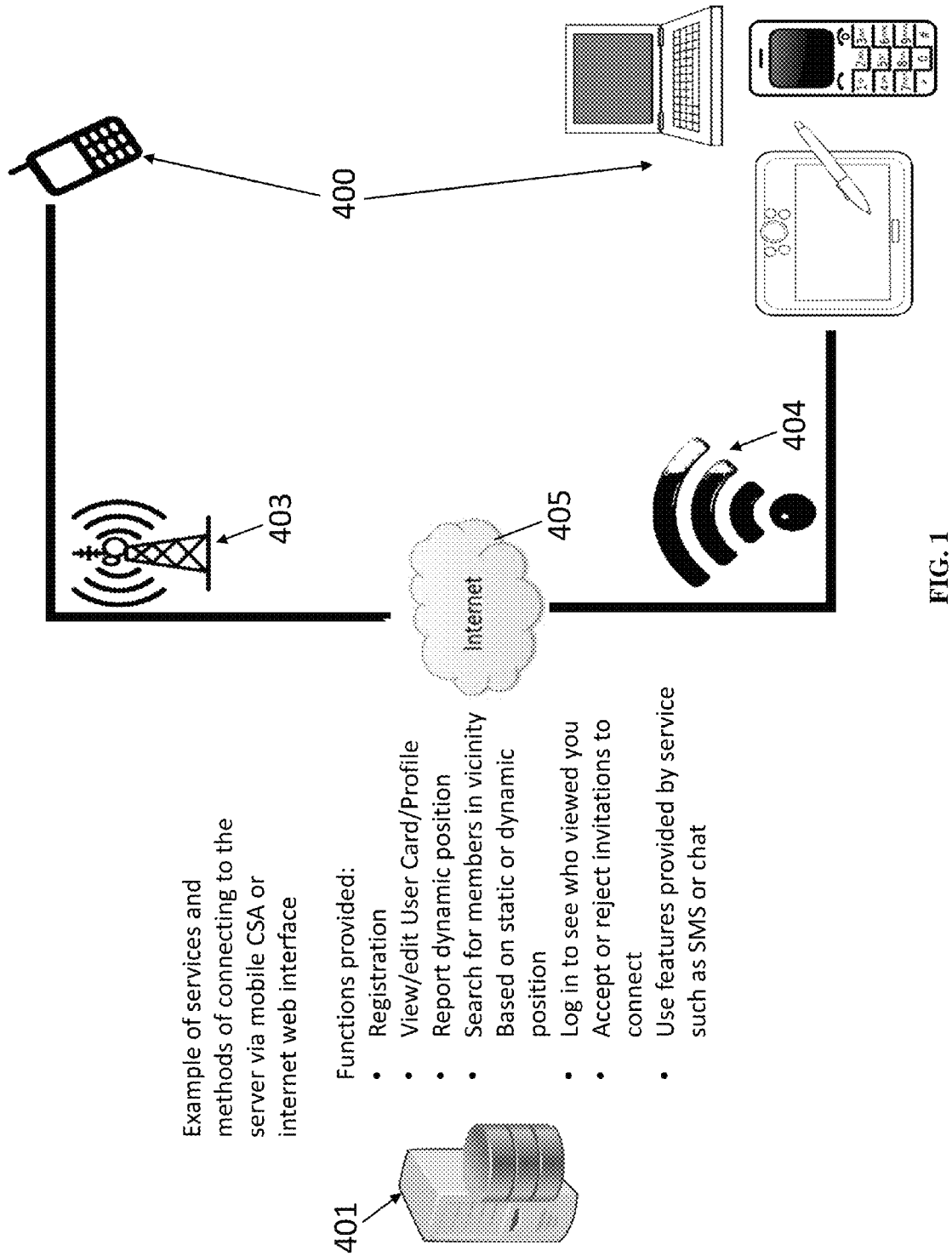
FIG. 1 illustrates communication links to/from mobile devices and a network-based server; according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those skilled in the art to practice the embodiments herein. Accordingly, the examples should not be construed as limiting the scope of the embodiments herein. As used herein, the terms "a" or "an" are used, as is common in patent documents, include one or more than one. In this document, the term "or" is used to refer to a "nonexclusive or" unless otherwise indicated.

The embodiments herein relate to members discovering other members in the same social network who are in the vicinity by personal attributes such as picture(s), name and location. The personal attributes are stored in users' profiles on the social network server and are associating with each member's unique hardware identification and log-in credentials. Discovering other members would be for the purpose of exchanging personal information, connecting to each other through the social network services and communicating through SMS, E-mail, chat/instant messaging, text, multimedia, or video features that maybe offered by the same social network.

According to one aspect of the embodiments herein, mobile device users sign up or register with a service through website or using their mobile device. For ease of registration, optionally the users can sign up using existing other social network credentials and import pictures from this second social network for the new account creation if this other social network allows porting of users' information and personal attributes such as picture(s) and name. Users may be required to provide additional information if personal attributes such as picture and name were imported via API from another social network to complete the sign up process. Signing up through a mobile device will require that the user clearly have downloaded the CSA (Client Side Application) from either a depository third party application provider or request from the service website to send to his/her mobile a link allowing the download of the application. Referring now to the drawings, and more particularly to FIGS. 1 through 9, where similar reference characters denote corresponding features consistently throughout the figures, there are shown preferred embodiments.

FIG. 1 illustrates how communication between mobile users 400 and the server 401 is conducted. FIG. 1 is directed to an arrangement in which a server/computing device 401 communicates bi-directionally with user devices 400 by way of a cellular base transceiver station (BTS) 403 through a standard that also provides separate facilities (not shown) for transmission of digital data. In certain embodiments, communication between the member's mobile devices and the server goes through a BTS 403, and communicates according to a packet-based telecommunications protocol such as GPRS, 3G, 4G, LTE or any alternative data technology. In FIG. 1, communication links to/from mobile devices 400 and a network-based server 401 are provided; e.g., internet server, over a BTS 403 using standard communication protocols that provide separate facilities for transmission of digital data, or through wireless connection 404 capable of connecting the user to the internet 405. As depicted, the mobile devices 400 may communicate through the server 401 to discover other members in the vicinity based on static location provided during sign up or dynamic location obtained from LBS, GPS, or Geolocation standards.

A list of example of services provided to various devices and mobile phones 400 regardless of method of communication used to connect to the server 401 via the internet 405 include registration, view newly created social card/profile, edit profile including adding multiple pictures, obtaining user location dynamically based on standard mobile communication protocols, search for members in vicinity, access additional features provided by social network such as chat/sms view members who discovered the user, accept or reject invitations to connect, and access any features provided by a social network.

Figure 2:
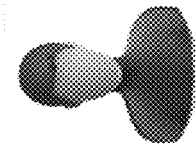
FIG. 2 illustrates an example of a computer or mobile device, and a generated display for registering with a service, according to an embodiment herein.

The user provides information by filling out an on-line profile through a web based interface or interface provided by the CSA, including uploading graphics or pictures. An example of an electronic generated sign-up screen is shown in FIG. 2. Additional aspects of the registration process include creating a social card or profile, which is intended to be shared with other users or be discovered by other users. The user's profiles are available for people in the vicinity to view, via a mobile data connection to internet or direct internet connection from the mobile device to local wireless network.

FIG. 2, with reference to FIG. 1, depicts an example of a computer or mobile device 100, and generated display 101 for registering with a service. This service may provide a user with a network-based storage for personal contact information, creation of a custom social card to send to discovered, or discovering, users who are also members of the service, for the purpose of providing personal contact information including personal attributes such as picture(s) to other users and for accessing personal contact information including personal attributes such as picture(s) by of other users of the service. The service may be part of a social network. The registration may offer option to sign up using another social network credentials for ease or registering and authentication. The CSA will obtain a mobile device unique ID upon complete sign up from a mobile device 100 or upon first access from a mobile device 100.

As mentioned above, the registration process also includes downloading of the CSA, where the CSA resides on the mobile device 100, and enabled to communicate directly with the service, through a provided internet connection, to synchronize/update contacts and to manage communication with contacts or potential new contacts, access account information via username/password, or phone ID, send search requests for information about users in the vicinity, send invitations, accept, exchange deny requests for exchange of information, obtain instances of the server addresses, allow the user to edit his/her own profile, update photos or information or add additional photos or information, etc. The CSA connects to the server through internet connection provided by the mobile device 100.

Personal and other user information can also be added by way of the CSA for storage on a server, including hobbies, business associations, or personal information as examples. This and other information can also be added for storage on the server means other than the CSA, such as the user's personal computer, a dedicated kiosk, or other means for accessing the server through the internet. In order to take advantage of the functionalities provided by the service, the member of the service ("member") should have a mobile communication device that provides separate facilities (besides voice transmission) for transmitting digital data. This allows a mobile phone to act like any other computer over the Internet, sending and receiving data via the Internet Protocol.

Figure 3:
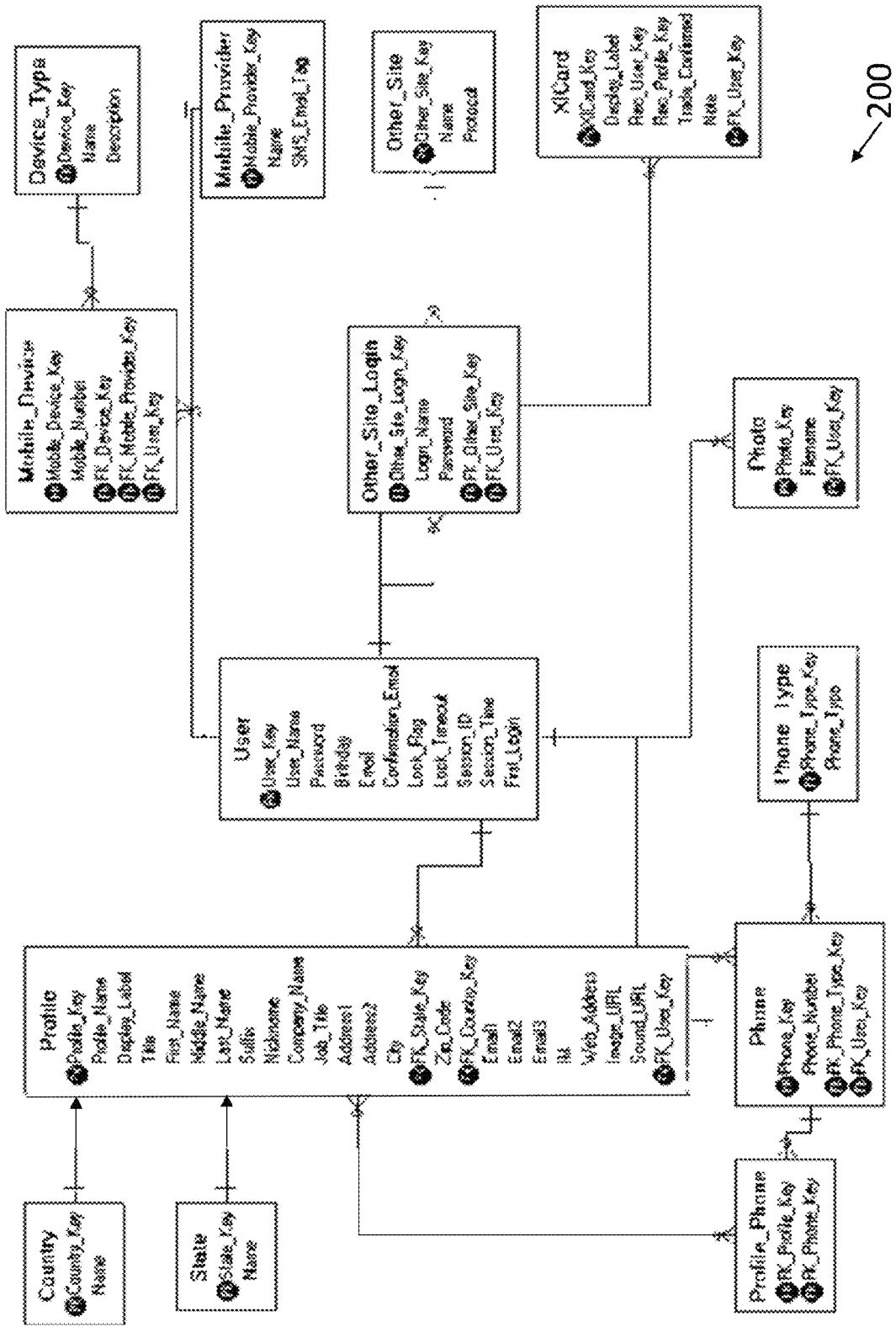
FIG. 3 illustrates an example of a database schema/structure for maintaining personal information about a user (member) registered with the service, according to an embodiment herein.

One format for storing information about a user/member of the service is shown in FIGS. 2 and 3. Depicted herein are some of the types of user information that may be stored and made accessible to the user at the server. Users may provide personal attributes such as name, address, and a picture. Information about the user's mobile device 100 may include the make, model, and phone number.

FIG. 3, with reference to FIGS. 1 and 2, illustrates an example of a database schema/structure 200 for maintaining personal information about a user (member) registered with the service. The information about the member may include, for example, his/her mobile device attributes such as the device key, mobile telecommunications provider; the mobile device type; the member's profile, e.g., name, address, etc.; stored photo(s) of the user; country/state where the member resides; and other information.

The service provided to users may be operated/accessible under a centralized computer system ("server"), which may include but not limited to four components: 1) Graphical user interface, providing an interface to members of the network to sign up, input/edit profile information, etc. 2) A scripting language designed for producing dynamic web pages and mobile language web pages. 3) A comprehensive data base that includes user's information, for example as discussed above and shown in FIG. 1. Computing capabilities such as calculating proximity of members based on static location information in database or dynamic location info obtained through the CSA.

Figure 4:
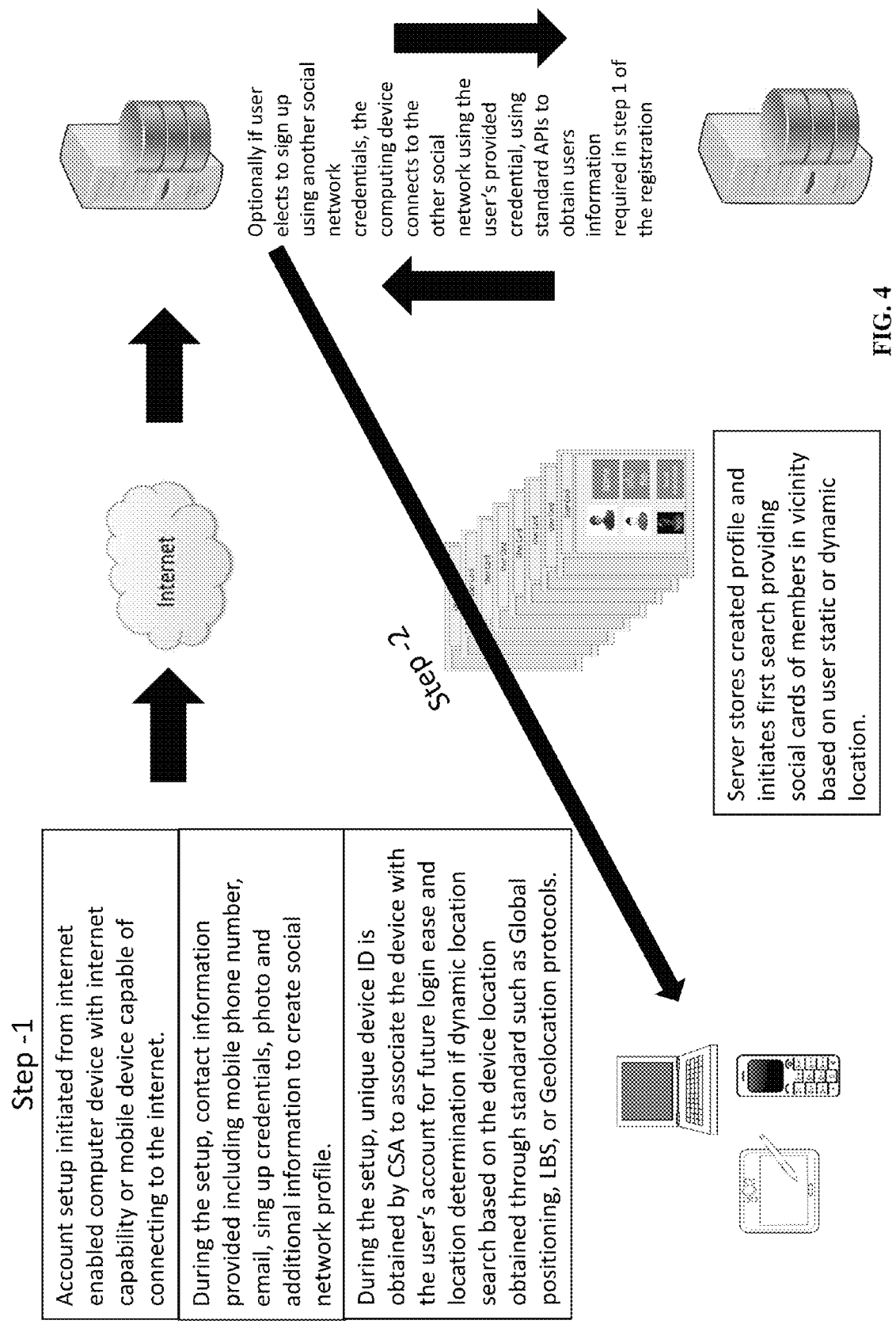
FIG. 4 is a flowchart associated with the creation of a social card and a user account/profile to initiate the use of the service of discovering others in the vicinity with personal attributes such as pictures and names, according to an embodiment herein.

FIG. 4, with reference to FIGS. 1 through 3, is a flowchart depicting a process for registering with the service: Account set up and information provided through a web-based User Interface 101, e.g., such as shown in FIG. 2; or mobile device CSA. The user optionally has the flexibility of signing up to the service and import personal attributes including picture, name and additional information by using a second social network credentials. The CSA collects characteristics from the mobile device such as a phone number or IMEI (international Mobile Station Equipment Identity) for the purpose of associating the mobile device 400 with a user account maintained at the server 401. This association between the unique ID such as IMEI, and the user account is used to report the mobile device location to the server dynamically and authenticate user with device used.

To completely utilize the mobile features provided by the service including dynamic search of members in vicinity, the user installs the CSA to the mobile device 400 that in addition to reporting location to the server, enables the user to update, replace, revise the social profile or personal attribute information, modify, hide or publish profile information (at the server) as contained in the user's contact information; e.g., the information contained in the user's profile which may be sent when the user initiates discovery process. Furthermore, the CSA allows the user to indicate interest in connecting with a member, or the user is discovered by others members searches and communicate to other members though features such as SMS, chat, text, and other features.

FIG. 4 illustrates how the server 401 may associate each mobile device 400 with a member account of the service using a unique ID such as IMEI. During the installation process, the server 401 receives from the CSA required Unique ID such as IMEI, or phone number. FIG. 4 is a flowchart associated with the creation of a social card and a user account/profile to initiate the use of the service of discovering others in the vicinity with personal attributes such as pictures and name. As well, it now allows other users to discover the new created account.

The CSA collects unique mobile device ID during the registration to associate with the newly created member profile for future location reporting and authentication for secure and future log in if needed. Once an account is created, the device 400 is not required to be powered on to be discovered. And the last location reported to the server 401 would be considered the current location OR the server 401 may elect to revoke last location reported and identify the user location to be the location provided during sign up as the default location known to the user.

Figure 5:
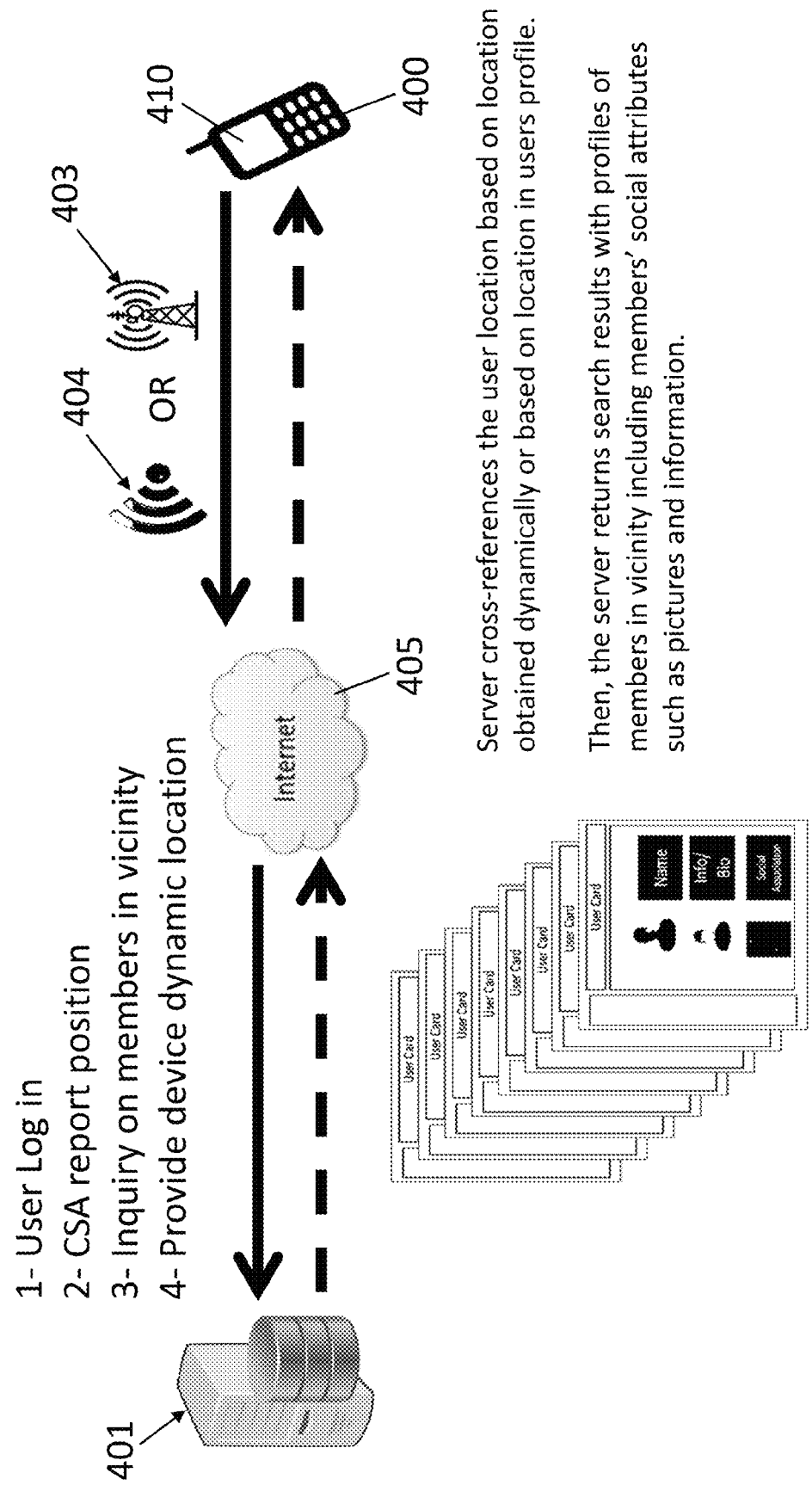
FIG. 5 illustrates a discovery process flowchart, according to an embodiment herein.

FIG. 5, with reference to FIGS. 1 through 4, illustrates a discovery process flowchart where a user connects to the server 401 using the CSA on the mobile device 400 which reports the user location and returns the search results after cross referencing the user location with other members to determine proximity. The server 401 shares with the inquiring user pictures and names and possible profile information so user can select from the list members to connect to.

When a user connects to the server 401 to inquire about other members in the vicinity, the server 401 returns the search results based on proximity and provides personal attributes of all members in the vicinity based on last location known regardless of those reported members are connected at the time to the service or not. Proximity can be a default value set by the server 401 to be within feet or miles, etc. and may allow users to select the value of that proximity for any search inquiry. The user can modify the search to adjust the distance to set parameters for the proximity or even request a search in proximity of a specific point like a convention center or a particular town.

The CSA connection to the server 401 by the device 400 may be used to accomplish three tasks: First, to connect to the service. Second, to provide update on location. Third, to inquire on members in the vicinity based on the current location. FIG. 5 illustrates the discovery of the users using the requesting user's mobile device 400 first to log in and associate the device with the user as well as report the location and initiate a request to discover members in the vicinity. The requesting user's resident CSA receives from the server 401, as a result, the profiles including pictures of all members in the vicinity.

The server 401, after receiving an inquiry on members in the vicinity, transmits back to the requesting user mobile device 400 the pictures and names, or other information, for each of the devices in the vicinity, which are then displayed on the inquiring user mobile device screen 410. The discovery process may thus include the showing of personal or detailed information that a member may wish to have displayed during the initial discovery step, rather than merely a device ID or address, device type, etc. At this point the requesting user has received a list of pictures and names which he/she can now select from the mobile device 400 if further connection is desirable.

In one example, in a first step of the discovery process, a user logs in the service and initiates an inquiry on members in the vicinity. The CSA reports to the server 401 the mobile device's 400 current location based on available cellular location information or IP address if the user is logged to the service via local internet connection. In the second step, the server 401 cross references the location of the user by other users know locations based on static data in the members profiles, and, current dynamic location based on latest reported location update obtained. Once the proximity calculation is complete, the server 401 returns to the first user the results of the search and provides personal attributes including pictures of all members in proximity of the first user.

Figure 6:
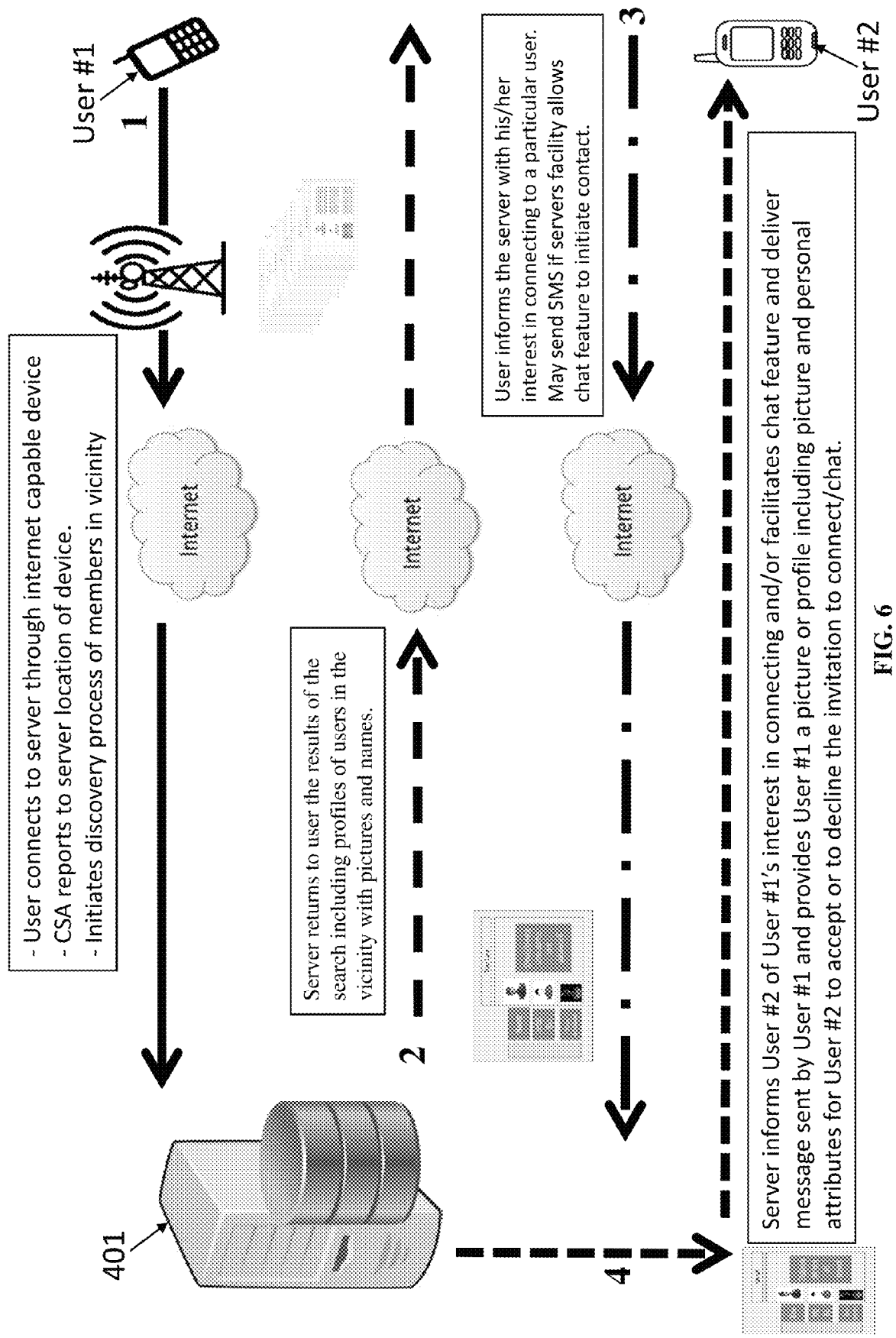
FIG. 6 is a flowchart for a discovery process between users, according to an embodiment herein.
Figure 7:
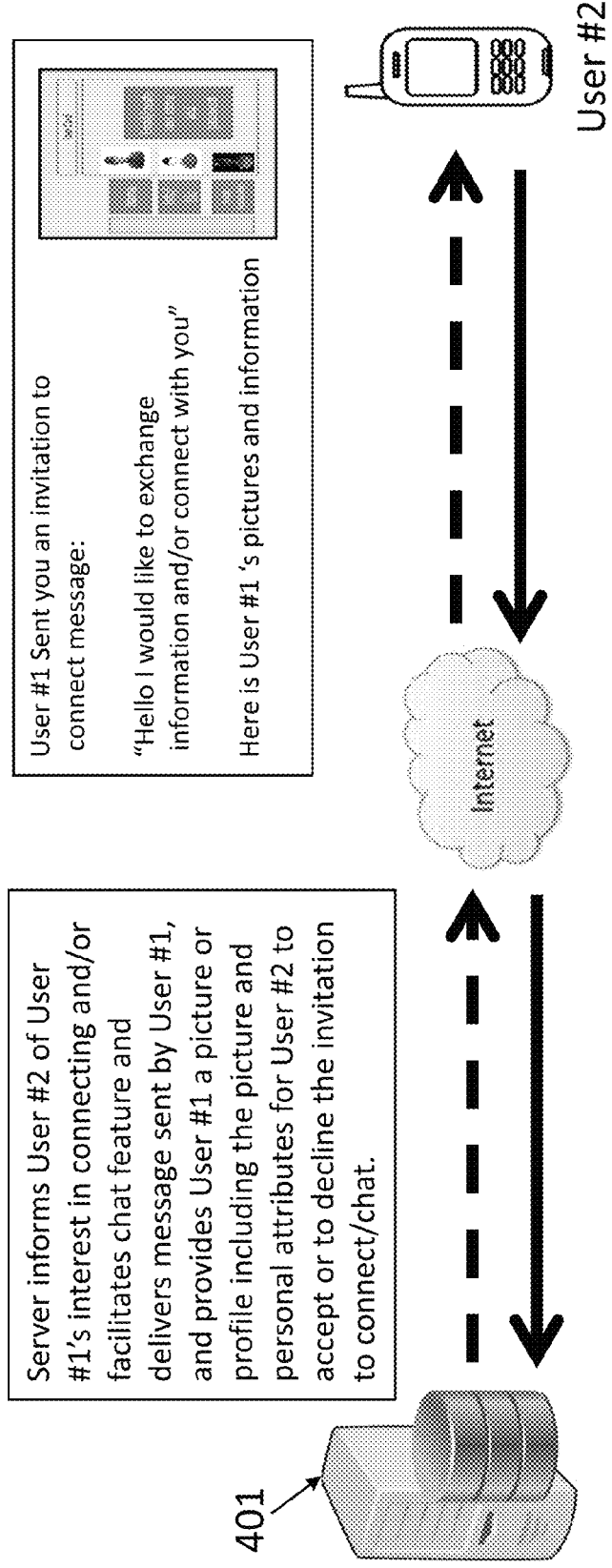
FIG. 7 is a flowchart depicting the processing of a user initiating discovery and showing interest to connect to a second user where all communication is managed by the server, according to an embodiment herein.

FIGS. 6 and 7, with reference to FIGS. 1 through 5, show in further detail how users may discover each other, in four steps:

Step 1: The user connects to server 401 through an internet capable device belonging to User #1, the CSA reports to server location of the device belonging to User #1 during the log in process, the user then initiates discovery process of members in vicinity by sending an inquiry to the server 401.

Step 2: The server 401 receives the request from User #1 CSA, the server 401 cross references the user location based on location obtained dynamically or based on the location in the user's profile. Then, the server 401 returns the search results with profiles of members in vicinity including member's social attributes such as pictures and information.

Step 3: The first user reviews the search results and informs the server 401 with his/her interest in connecting to a particular second user (User #2).

If applicable, User #1 may send to User #2 a message/email/sms through the server 401 if the server's facility allows such features to initiate contact.

Step 4: The server 401 informs User #2 of User #1's interest in connecting and/or facilitates a chat feature and delivers the message sent by User #1, and provides User #1 a picture or profile including the picture and personal attributes for User #2 to accept or to decline the invitation to connect/chat.

FIG. 6 is a flowchart for a discovery process between users (User #1 and User #2) where User #1 connects to server 401 through an internet capable device and CSA reports to server location of the connected device. Based on the reported location or location stored in user's profile, the server 401 returns to the User #1 profiles of all users in the vicinity based on proximity with pictures of each user.

If the user (e.g., User #1) elects to connect with any of the suggestions, the user (e.g., User #1) indicates this and the process of informing the other member (e.g., user #2) is managed by the server 401. No direct contact occurs between users at this point and will not unless the users elect to exchange personal information such as mobile numbers to connect outside of provided service and features. This managed communication by the server 401 insures privacy and allows users to reject connections or terminate conversations without having to worry about direct connections potential issues. The communication between the server 401 and CSA are conducted via a common internet protocol suite which includes an application layer, transport layer, internet layer, and link layer.

FIG. 7 shows a further example of notification to discovered users alerting them to an exchange request. The notification shows the other users' personal attributes including name and picture. FIG. 7 is a flowchart depicting the processing of a user initiating discovery and showing interest to connect to a second user (e.g., User #2) where all communication is managed by the server 401, according to an embodiment herein. FIG. 7 describes additional aspects of notifications and responses options to requests for exchange of electronics coordinates, personal information or connecting. All communication between users for the purpose of connecting members after the discovery is managed by the server 401.

User #2 (the discovered user) has the option of accepting the invitation, ignoring/declining or engage in services provided by the server 401 such as chat or sms with or without accepting connection with User #1. Since all communication between members is managed by the server 401, the server database 401 may store any contact information exchanged and add it through a synchronization method with the CSA as well as keep the history of any conversations/SMS between the members.

The CSA includes feature such as storing edits to profile or communication between the members and synchronizes to the server database 401 for storage once connection between CSA and server 401 is established. This dual storage feature allows the user to restore communication between users on a new device if the device in use is lost or damaged as well as restoring all account information.

In the case where a user switches mobile devices, all the user has to do is to install the CSA on the new device and login with his/her credentials. Once an internet connection is established between the new device CSA and server 401, and user credentials; the server 401 synchronizes all stored information to the new device, and the new installed CSA reports the new device unique hardware identification.

Figure 8:
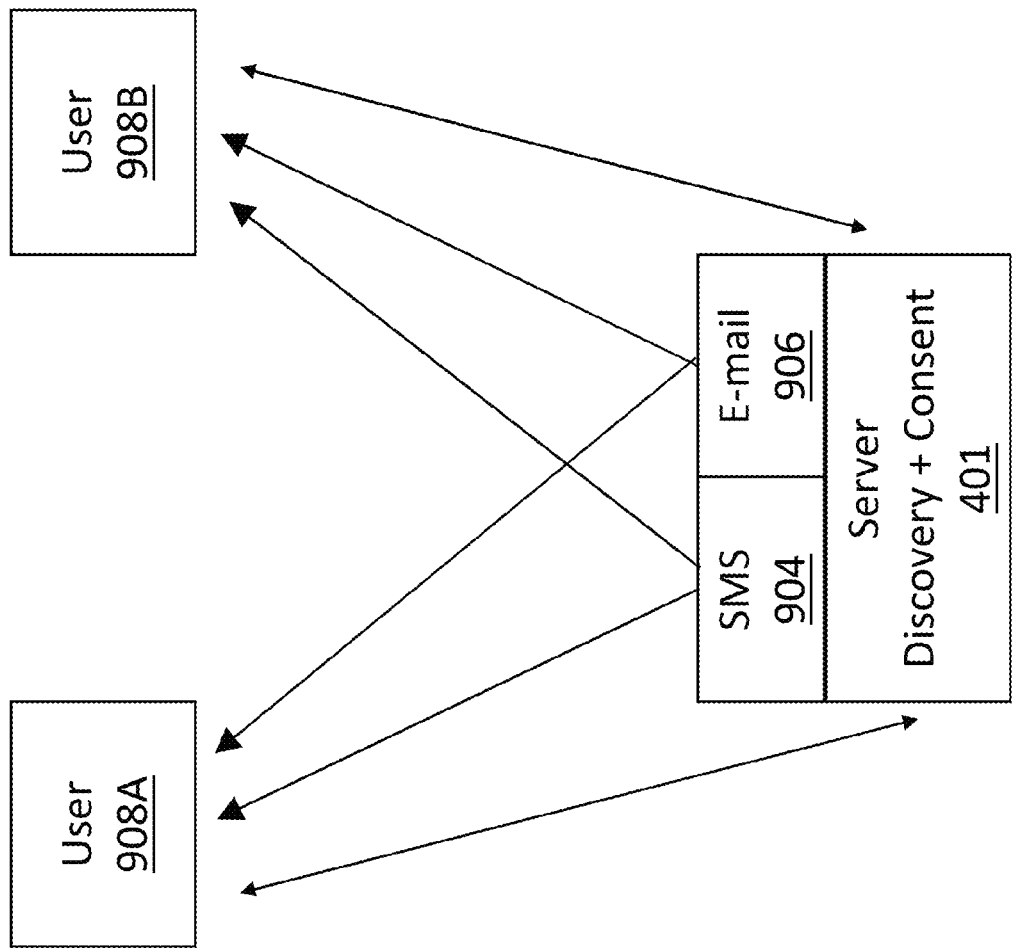
FIG. 8 illustrates the establishment of the communication between users, according to an embodiment herein.

A server 401 is able to facilitate communication between the two users and may provide additional features such as the ability to chat via SMS or email service and other services as illustrated in FIG. 8, with reference to FIGS. 1 through 7. In particular, FIG. 8 illustrates the establishment of the communication between users 908A, 908B, such as for example SMS 904, E-mail 906, chat/instant messaging, in the form of text or multimedia, video, etc., between consenting users 908A, 908B via a server 401 that initiates discovery and consent for the users 908A, 908B to exchange data.

The embodiments herein provide a medium for near real-time exchange of contact information, unlike E-mail, SMS or other modes of communication between mobile devices. In this sense the user experience is enhanced over the exchange of E-mail or texting among phones, in at least three ways. First, a requesting device is not limited to conversing with only members that he/she can contact through a known e-mail address, phone number, etc. Second, the exchange may proceed simply by initiating discovery and/or responding to a discovery request. Third, the exchange can occur among multiple members of a service at the same time.

The centralized computer system ("server") 401 may include, or be associated with, an SMS server platform 904 or E-mail platform 906 that provides a corresponding channel of communication between the users 908A, 908B. The users 908A, 908B are shown communicating directly with one another via SMS platform 904 and/or E-mail platform 906, facilitated by server 401.

Members can contact other users, through offered types of communication between them, for example SMS, E-mail, chat/instant messaging, in the form of text or multimedia, video, etc., can also be facilitated. This is depicted in FIG. 9, with reference to FIGS. 1 through 8, and which illustrates an arrangement in which a server 401 receives GPS/LBS/RTLS/GEOLOCATION coordinates from users 1004A, 1004B, compares these coordinates to determine proximity, and informs the users 1004A, 1004B of the proximity.

Figure 9:
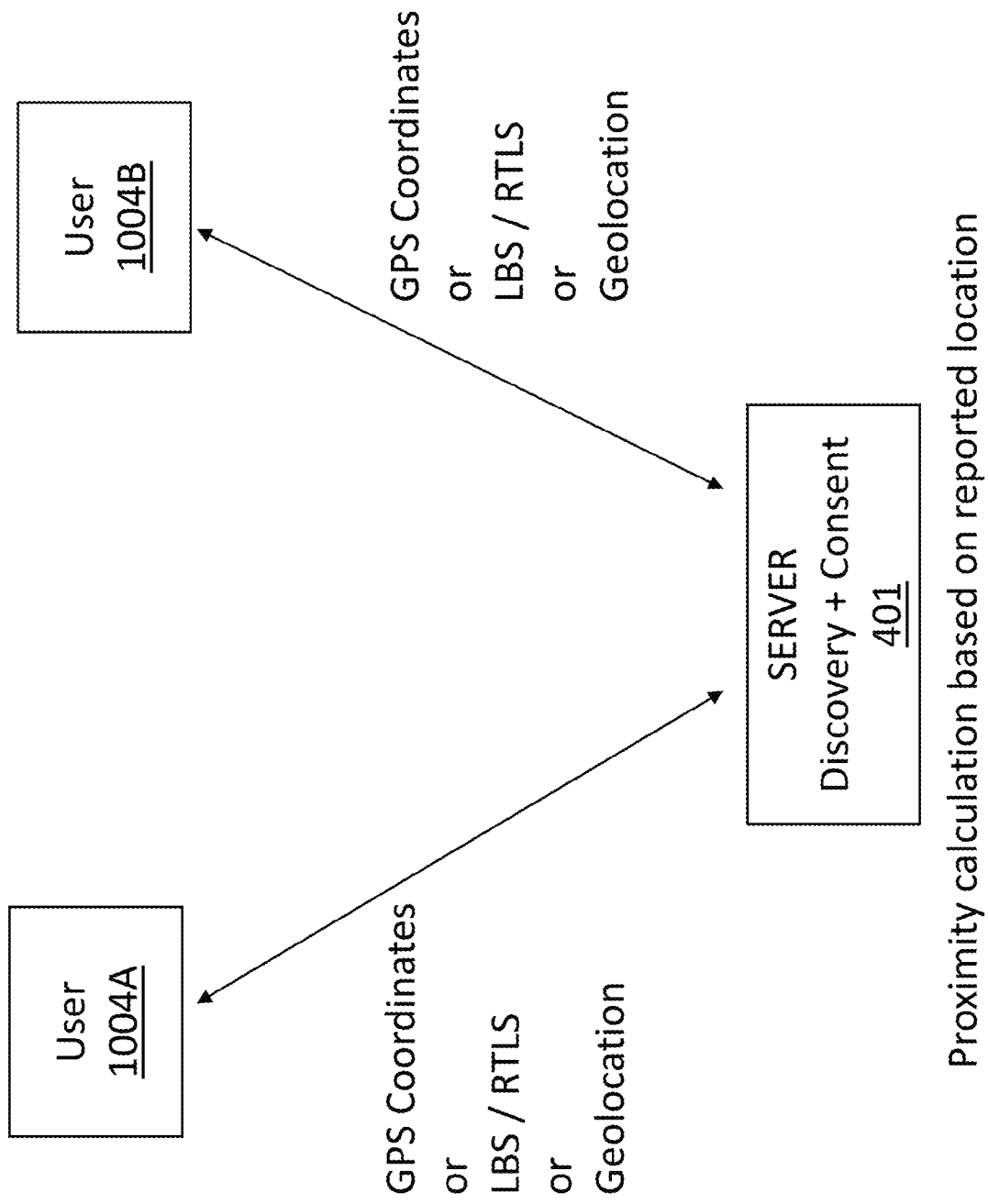
FIG. 9 illustrates an arrangement in which a server receives GPS/LBS/GEOLOCATION coordinates from users, compares these coordinates to determine proximity, and informs the users of the proximity, according to an embodiment herein.

In FIG. 9, server 401 is shown receiving GPS coordinates, or LBS or RTLS Location Services information, or Geolocation information, from Users 1004A and 1004B, comparing these coordinates to determine proximity, and informing the users of the proximity. Informing one user of another's proximity can be contingent upon consent of the users 1004A and 1004B, as obtained above, and can be performed in gradations, for example initially sending limited information of one user to another, then increasing the delivered information and establishing contact depending on consent. In certain embodiments, the participating members 1004A and 1004B report their locations to the server 401, for example periodically, and the server 401 maintains a record of and updates these reported locations, and provides reports to certain users, for examples to those belonging to a common social network. Members' profiles that are connected can be updated to reflect such connection information by the server/computing device 401.

In certain embodiments, the CSA, residing on the mobile device 400, may have but is not limited to the following software functionality: authentication and credentials storage capabilities.

An "authentication" portion requests authentication parameters from a user (ID or user login name and password); connects to an instance of server 401; sends user authorization information to the server side using ID or user name and password; displays a reason for denied access in case of incorrect login; and exits from the software in case of a preset number of incorrect logins; allows a user to change the password; and downloads profile information from the server 401. The CSA has the ability to store log-in credentials such as user name and password on the device 400 and transfer the credentials to the server 401 for storage in user profile database.

Another form of authentication is to insure that the unique mobile ID obtained and on record is associated with the user's log in credentials and matches user stored information. Optionally, and with user permission, the service may connect to another social network database through APIs, which are application programming interfaces, to access other social network users attributes such as name and picture.

The methods of connecting an application programming interface would differentiate from one social network to another and be proprietary to the respective social networks. An application programming interface (API) is a set of routines, protocols, and tools for building software applications for connecting one network to another network. An API expresses user attributes such as name, picture, and any additional information on the user. The API expresses as well the social network operations, inputs, out-puts, and underlying types.

The embodiments herein recognize the previously listed advancements, while the application fills the gap between locating devices and how to humanize the devices by associating personal attributes to each device so when a search is done, a face is found rather than a hardware ID number. None of the conventional standards/technologies used to locate mobile devices specified or provided methods allow the ability to associate devices with personal attributes or profiles that include picture and name. Associating personal attributes such as pictures and personal attributes allow users to identify other members and select members whom they wish to exchange contacts with or connect with through the social network.

Certain embodiments herein provide a system and method that allows individuals to use their mobile phones to discover others in the vicinity by personal attributes, such as by photos and name, after which, the two parties can exchange information through the social network via an internet connection bypassing the inherent limitations of same brand devices technology; e.g., security/privacy limitations and compatibility issues that limit or prohibit ad hoc communication.

The system includes a network-linked storage facility that collects information provided by members of the group; e.g., members of the social network, along with personal attributes in a data base hosted by a centralized computer with internet connection. The system associates a member's phone ID to the member's account/profile. The phone association takes place when the user downloads a client-side application which collects, among other things, a unique phone characteristic such as a standard IMEI (International Mobile Station Equipment Identity) or serial number of the mobile device or a unique identifier to associate the member with the account.

According to yet another embodiment, a system for exchanging information among members of a group is provided, such as members of a social network service, and includes an internet based server having a registration portion. After a user has registered online with the service, the server may send the application to the mobile device to download a client-side application into the mobile device. Alternatively, the user may download the CSA from the server or a third party depository offering the service to download the CSA.

A registration process is complete when a user creates a customized social card or profile with the social network, and the user may thereafter see or edit his/her social card on the mobile device or online through a device that connects to the internet. Any changes to the user's card or profile will be updated on both, the server of the social network and the CSA.

Another embodiment provides profiles that can be created by importing some or all information from a separate social network that offers API connections to users' information. This provides ease for registering and authentication to associate the discovery service with another social network that does not or may not offer such a discovery service of members in vicinity.

According to an embodiment herein, the process of discovery and exchange of contact information requires a CSA (Client Side Application) that is installed on the users' mobile devices and can connect users to the service computing device through an internet connection. The CSA functions include but are not limited to, obtaining user credentials for logging into the social network, obtaining unique hardware ID to link to user account, allowing user to edit profile and personal attributes, manage communication with contacts and access features of the service provides such as SMS, text, voice, multimedia and communications with other members.

The vicinity and determination of the proximity is based on either static or dynamic user location. The static location is what the user enters during registration and saved in his/her profile, or obtained through API from another social network if the user elected to sign up to the service with another social network credentials. The dynamic location is a data point entry in the user's profile location which is constantly updated based on information obtained each time the user logs into the social network. The dynamic updated information is obtained through location standards such as GPS, LBS, RTLS or Geolocation services.

The embodiments herein fill a gap left by the existing standards and technologies when it comes to the actual discovery process and exchange of contact information over the internet bypassing ad hoc communication and compatibility and provides personalized way of discovering people by pictures primarily.

According to another embodiment herein, a method for meeting people including discovering people; e.g., viewing their pictures, names, or other personal information, and selecting one or more people to send an invitation to, is provided. The invitation may take the form of a social card, V-Card, or other manner of engaging another person in a social atmosphere like quick SMS or flag that there is interest of connecting, or even a business setting such as a meeting, trade show, conference, etc.

In one aspect, the embodiments herein provide a system and method that enables discovery of others who also desire social interaction, but without being constrained by hardware compatibility issues inherent in mobile devices by different manufacturers. According to this aspect of the embodiments herein, mobile device users (or users) can offer to other, nearby users, their pictures or other information as part of a discovery process, save contacts received from other users, and keep contacts stored on a mobile device up to date by upload/download of personal information through a networked storage capability provided by the computing device; e.g., an internet-linked storage device accessible through a cellular phone network.

For purposes of explanation, the following definitions are adopted. A "requesting user" is the person or person(s) who is connected to the service of the social network through the internet using an internet-enabled mobile device, initiates a discovery process; e.g., search for other members in the vicinity, and a "discovered user" is the person or person(s) belonging to the same social network and may or may not be connected at that time to the service but in the vicinity of the requesting user and his/her personal attributes provided as a result of the initiated inquiry to the requesting user.

In one example, two persons, a requesting user and discovered or discoverable user are members of a social network which allows the members to communicate with each other as part of the social network service. The social network computing device includes a server that stores personal attribute information including static location, capable of obtaining dynamic location data and capable of calculating the proximity of members based on location regardless if it's static or dynamic. A standard discovery process may be initiated by the requesting user for other members in the vicinity. Once the user logs into the service with the mobile device using the CSA (Client Side Application), the computing device obtains location of the user based on LBS, RTLS or Geolocation, etc.

The computing device of the social network cross-references the user's location with registered members in the vicinity of the first user and returns the results by disclosing personal attributes including pictures and names of all members in the vicinity based on proximity location. The user who initiated the inquiry can select from the results returned any discovered user he/she wishes to connect with and send a form of invitation to connect using network available tools such as email, sms, text or any customized invitation form. The invitation to connect to the inquiring user would include his/her personal attributes including picture and name. The discovered member who received invitation can accept, ignore or decline connecting with the inquiring user.

The communication between requesting and discovered users may then proceed through services provided by the social network computing device, thereby bypassing the limitations of communication over one protocol, network limitation/fees, or devices incompatibility. As an example, one member can be connected to the service of the social network and the computing device through internet service over cellular signal while the other person could be connected to the same service through WiFi® signal that provides internet access.

The computing device can be configured to frequently push updates of a user's contacts to his/her mobile device, and maintain backup of contacts and information of each user. Additionally, the computing device of the social network with the storage service may be configured to initiate an exchange of contact by suggesting to members recommendations on other members to connect with that could be a good fit to the user. The computing device can share with the user personal attributes of other members in the vicinity such as pictures and information of potential matches to connect with. The computing device is capable of cross-referencing members' locations and calculating the distance between members to eliminate members that are not in close proximity or in vicinity of the user conducting the search.

Users have the ability to customize their search proximity calculation by setting the distance and area for search. As an example, a sales person may look for members in the vicinity of 20 miles from him to introduce himself to. Alternatively, a person who is missing a convention in NYC while in California, may start search for members in NYC while he is in California to discover people he wishes to connect with. The recommendations based on vicinity are based on user's static location in a profile or dynamic updated location obtained from user's last log into the service.

According to another aspect of the embodiments herein, a system and method is provided that allows users of the social network, or more generally a database service, to create custom social cards that include social profiles, email information, phone numbers and/or multiple pictures as a personal attribute. In one embodiment, a social card associated with the discovered user may be viewed when a requesting user initiates an inquiry, this unique experience puts a human face on each phone detected during the search rather than an uninteresting Bluetooth® address which is current method of returning search in vicinity now using short range wireless signal.

For instance, the social card may include a picture, a name, location, personalized icons or card designs, etc. Furthermore, the requesting user may receive a plurality of such social cards when there are many members of the service within the short range network or vicinity, or geographic area as defined by the user who is conducting the search.

If the requesting user elects to make contact with one or more of the members discovered in the vicinity, he/she may send an invitation including sharing the requesting user's card or custom profile containing a picture or pictures of the requesting user with a personalized message intended to spark an interest with the discovered user. The discovered user may then respond by accepting a connection, denying or utilize other services provided by the social network such as SMS, chat or email between users.

According to another aspect of the embodiments herein, a method for discovering a person over a type of communication network is provided, and then the method permits communicating with that person over a second type of communication network after initial acceptance; e.g., using a WiFi® network to connect to the internet and discover the person. The first member can then continue communication with the second member later on a cellular phone network that provides data connection to the internet. This means that as long as both members connected to the service via an internet connection, they can communicate regardless of proximity or type of device each member may have or type of method used to connect to the internet.

The server is capable of providing information to members mobile devices phones not capable of exchanging data via Bluetooth® or the related ad hoc network communication protocol, and/or not connected to a cellular phone network via a common cellular phone network provider, or provider plan as long as the device has capability and is connected to the internet.

The method may further include the step of selecting and exchanging information based on pictures received as a result of the promotional message by the service to encourage members to connect to others in the vicinity. The mobile device users are members of a social network service that operates/maintains the server.

According to another embodiment, a server is provided that is capable of providing a communication between a first and second mobile phone user through the server and inform each member that they received message or invitation from others members. Notifications to mobile device users about invitations or messages received can be sent to users by SMS or the CSA notification messaging services.

In certain embodiments, unique member identifiers comprising a Bluetooth® device address, or a WiFi® address, or a main component address such as IMEI, which is the international mobile station equipment identifier, is associated with the device and member login credentials; and are stored on the server associated with the user's profile/social card.

This authentication is important so when a search is conducted on a mobile device and hardware ID is returned as search results from standard protocols, the embodiments herein associate a profile with the unique ID and returns the search results in the form of personal attributes such as picture and name. Additional advantages are detailed later for authentication with devices, retrievals of account on new devices and more. The system provided by the embodiments herein does not require that discoverable members have their respective devices turned on at the time of the search conducted by the first user or connected at the time to the service through internet connection. Thus, the server returns the search results of all members in the vicinity based on their location and proximity to the first user based on stored static locations and the latest dynamic location known and stored on the server.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. A system comprising:
   a computing device configured to communicate with various mobile and terminal devices to manage introduction and connection of members belonging to a same network by sharing personal attributes between members such as picture(s) and name, wherein said computing device associates unique hardware identification of member devices and login credentials with member profiles and via a search process returns searches of members for others in a vicinity or in proximity thereto, and with personal attributes comprising pictures and names bringing an image of a human face to a device allocation in said search process; and
   a first user using a respective first mobile communications device and a second user using a respective second mobile communications device each capable of connecting to the internet through any of a mobile telecommunications provider network and a local area wireless network,
   wherein said computing device being in communication with the first and second mobile communication devices through internet connection via an application installed on the respective first and second mobile communication devices of the users, and configured to provide access to stored user profile information about said first user and said second user, respectively, including personal attributes comprising picture(s), a name, information, and a location,
   wherein said computing device is configured to store static locations of members and receive information identifying current dynamic locations of all members based on real time location reporting from a client side application,
   wherein said computing device is configured to calculate and determine a proximity of user locations based on any of a static and a dynamic location of the members which are updated on a profile database of said members,
   wherein said computing device is configured to send to said first user upon inquiring of other members in the vicinity of said first user, personal attributes of all other members based on proximity calculations to select members that said first user may wish to connect with, and to send to said second mobile communication device an invitation on behalf of said first user and including first user personal attributes for said second user to accept connecting with said first user,
   wherein said computing device is configured to connect said first user and said second user through a members-only-social-network communication tools between said first user and said second user, wherein said communication tools comprise any of SMS, E-mail, chat/instant messaging, multimedia, voice, and video, and
   wherein said computing device is configured to locate information about said second user from a social network storage file of said second user, and transmit this information to said first mobile communications device for further information beyond first introductory attributes such as picture and name only.

2. The system of claim 1, wherein the first and second users are members of a same social network, and wherein said computing device is operable to disclose social network attributes of said first and second users in the vicinity or within a particular distance from one another for connecting members.

3. The system of claim 1, wherein said computing device is configured to receive customized parameters from said first user on a search vicinity scope and a customized selection of a start point other than a current user location.

4. The system of claim 2, wherein said computing device is operable to provide any user with said social network attributes of all members in said social network in the vicinity or in proximity thereto.

5. The system of claim 2, wherein said computing device is configured to receive an inquiry from said first user regarding members in proximity to a first user location.

6. The system of claim 2, wherein said computing device is configured to recommend to members other members in the vicinity to connect with to promote social interaction.

7. The system of claim 2, wherein said computing device is configured to report to said first user social network attributes of all members of said social network who are in proximity to said first user.

8. The system of claim 7, wherein said computing device is configured to receive from said first user a selection of one or more additional users with whom said first user wishes to connect with through said social network.

9. The system of claim 7, wherein said computing device is configured to send to said first user further social attributes of one or more of selected additional users beyond the picture and name used in the introductory search results.

10. The system of claim 2, wherein said computing device is configured to obtain permission of a selected user prior to revealing further information beyond an introductory picture and name when a user preference is set for such a permission requirement.

11. The system of claim 1, wherein said computing device is configured to update profile information to indicate that the first and second users are connected.

12. The system of claim 2, wherein said computing device is configured to update profile information to indicate that the first and second users are connected.

13. The system of claim 2, wherein said computing device is configured to store communication between members and synchronize saved communication on a client side application used on devices for communication.

14. The system of claim 1, wherein said computing device is configured to assess a proximity of users to one another based on any of a static location information in a user profile and updated location indicators of a user dynamic location.

15. The system of claim 14, wherein updated location indicators are based on user location information reported to said computing device by any of mobile device real time location reporting technology and internet protocol address location information and saved to profiles of users.

16. The system of claim 1, wherein said computing device permits discoverable members to have their respective devices turned on or turned off at a time of a search being conducted by said first user, wherein said computing device permits said discoverable members to have their respective devices unconnected to an internet connection service at said time of the search being conducted by said first user, and wherein any of turned off devices and disconnected devices is discoverable by said computer device as said internet connection service is configured to report said any of turned off devices and disconnected devices as discoverable based on a latest static and dynamic location in proximity to said first user.

17. A method comprising:
    using a computing device to communicate with various mobile and terminal devices to manage introduction and connection of members belonging to a same network by sharing personal attributes between members such as picture(s) and name, wherein said computing device associates unique hardware identification of member devices and login credentials with member profiles and via a search process returns searches of members for others in a vicinity or in proximity thereto, and with personal attributes comprising pictures and names bringing an image of a human face to a device allocation in said search process;

providing a first user using a respective first mobile communications device and a second user using a respective second mobile communications device each capable of connecting to the internet through any of a mobile telecommunications provider network and a local area wireless network;

using said computing device to be in communication with the first and second mobile communication devices through internet connection via an application installed on the respective first and second mobile communication devices of the users, and to provide access to stored user profile information about said first user and said second user, respectively, including personal attributes comprising picture(s), a name, information, and a location;

using said computing device to store static locations of members and receive information identifying current dynamic locations of all members based on real time location reporting from a client side application;

using said computing device to calculate and determine a proximity of user locations based on any of a static and a dynamic location of the members which are updated on a profile database of said members;

using said computing device to send to said first user upon inquiring of other members in the vicinity of said first user, personal attributes of all other members based on proximity calculations to select members that said first user may wish to connect with, and to send to said second mobile communication device an invitation on behalf of said first user and including first user personal attributes for said second user to accept connecting with said first user;

using said computing device to connect said first user and said second user through a members-only-social-network communication tools between said first user and said second user, wherein said communication tools comprise any of SMS, E-mail, chat/instant messaging, multimedia, voice, and video; and using said computing device to locate information about said second user from a social network storage file of said second user, and transmit this information to said first mobile communications device for further information beyond first introductory attributes such as picture and name only.

18. The method of claim 17, wherein the first and second users are members of a same social network, and wherein said method further comprises using said computing device to disclose social network attributes of said first and second users in the vicinity or within a particular distance from one another for connecting members.

19. The method of claim 17, further comprising using said computing device to receive customized parameters from said first user on a search vicinity scope and a customized selection of a start point other than a current user location.

20. The method of claim 18, further comprising using said computing device to provide any user with said social network attributes of all members in said social network in the vicinity or in proximity thereto.

21. The method of claim 18, further comprising using said computing device to receive an inquiry from said first user regarding members in proximity to a first user location.

22. The method of claim 18, further comprising using said computing device to recommend to members other members in the vicinity to connect with to promote social interaction.

23. The method of claim 18, further comprising using said computing device to report to said first user social network attributes of all members of said social network who are in proximity to said first user.

24. The method of claim 23, further comprising using said computing device to receive from said first user a selection of one or more additional users with whom said first user wishes to connect with through said social network.

25. The method of claim 23, further comprising using said computing device to send to said first user further social attributes of one or more of selected additional users beyond the picture and name used in the introductory search results.

26. The method of claim 18, further comprising using said computing device to obtain permission of a selected user prior to revealing further information beyond an introductory picture and name when a user preference is set for such a permission requirement.

27. The method of claim 17, further comprising using said computing device to update profile information to indicate that the first and second users are connected.

28. The method of claim 18, further comprising using said computing device to update profile information to indicate that the first and second users are connected.

29. The method of claim 18, further comprising using said computing device to store communication between members and synchronize saved communication on a client side application used on devices for communication.

30. The method of claim 17, further comprising using said computing device to assess a proximity of users to one another based on any of a static location information in a user profile and updated location indicators of a user dynamic location.

31. The method of claim 30, wherein updated location indicators are based on user location information reported to said computing device by any of mobile device real time location reporting technology and internet protocol address location information and saved to profiles of users.

32. The method of claim 17, further comprising:

using said computing device to permit discoverable members to have their respective devices turned on or turned off at a time of a search being conducted by said first user; and using said computing device to permit said discoverable members to have their respective devices unconnected to an internet connection service at said time of the search being conducted by said first user, wherein any of turned off devices and disconnected devices is discoverable by said computer device as said internet connection service is configured to report said any of turned off devices and disconnected devices as discoverable based on a latest static and dynamic location in proximity to said first user.

\* \* \* \* \*